Dec. 13, 1960 P. J. VIEHMANN, JR 2,963,795
CONDITION INDICATOR FOR TRAINING DEVICES
Filed April 24, 1958
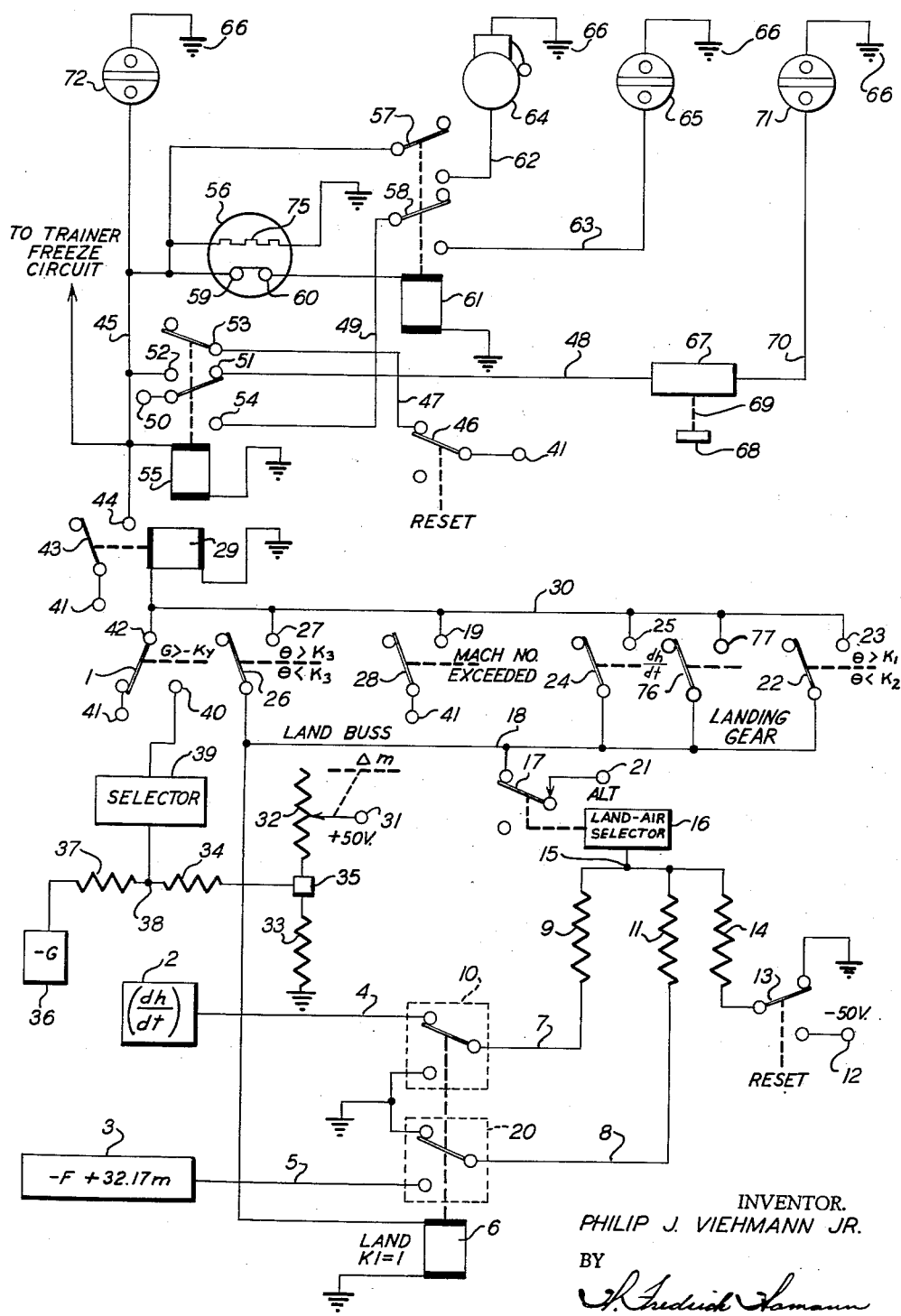
INVENTOR.
PHILIP J. VIEHMANN JR.
BY
ATTORNEY United States Patent Office 2,963,795
Patented Dec. 13, 1960

2,963,795
CONDITION INDICATOR FOR TRAINING DEVICES

Philip J. Viehmann, Jr., Silver Spring, Md., assignor to ACF Industries Incorporated, New York, N.Y., a corporation of New Jersey Filed Apr. 24, 1958, Ser. No. 730,658

5 Claims. (Cl. 35—12)

This invention relates to condition indicators for training devices and more particularly to crash indications in flight simulators. The purpose of the invention is to satisfy the need for visual and aural indications of one or more conditions during the operation of a device and in the preferred embodiment provides such indications in response to crash conditions which may occur in a flight simulator. This is accomplished by means of electronic and electro-mechanical circuitry which operates in response to various computed values related to the simulated flight.

During the operation of an aircraft, various conditions or combinations of conditions may arise which would cause an accident or crash. Some of the conditions which might cause such a crash while the craft is airborne are excessive velocity or excessive force due to rapid maneuvers of the plane. Conditions occurring while the aircraft is on or near the land which may cause a crash are excessive pitch angle, excessive roll angle, landing gear not extended, or an excessively rapid rate of descent upon landing. Although the aforementioned conditions would cause an accident in any type of aircraft, the absolute values of the velocities or angles which would cause a crash vary from aircraft to aircraft.

In the simulation of an aircraft there is a need for indicating to the student pilot that some condition has been exceeded to the point that a crash would have occurred had the student been operating an actual aircraft. It is to the satisfaction of the aforementioned need that this invention is directed.

The present invention is a system which monitors the simulated aircraft attitude with respect to the land and disengages those condition controls which are ineffective under the particular operation conditions of the flight simulator. Thus, after the student has properly simulated a take-off, those circuits which would give a crash condition indication, because of proximity to the land, are disengaged. In this manner, a change in roll angle for example, or failure to lower the landing gear, which would give a crash indication under grounded conditions, is no longer a crash indicator under simulated flight conditions. In a similar manner, excessive rate of descent depends upon altitude with respect to the land before it is activated as a crash indicator, pitch angle is an operative crash indicator energizer only when simulated landing conditions are present. On the other hand, such crash indications as excessive Mach and force are simulated flight condition crash indicators. Excessive velocity is manifest in either the force or Mach crash indicators. Thus it is apparent that the present invention realistically simulates the conditions or combinations of conditions which would result in a crash if these conditions were present in an actual aircraft.

It is, therefore, the broad object of this invention to provide a condition indicator for training devices.

It is a further object to provide an indication of crash conditions to student pilots during the operation of flight simulators.

It is another object of the present invention to provide an indication of crash condition or conditions to a student pilot during the operation of a flight simulator which conditions are determined depending upon the simulated position with respect to the land.

It is a still further object of this invention to provide an electromechanical device for presenting visual and aural indications of crash conditions to student pilots during the operation of simulated aircraft devices.

The invention embodies other novel features, details of construction and arrangement of parts which are hereinafter set forth in the specification and claims and illustrated in the accompanying drawing, which is hereby made a part of the specification, wherein:

The drawing is a schematic illustration of the crash condition indicator circuit of the preferred embodiment of the present invention.

In the schematic illustration there is indicated switches which are operated in accordance with various electromechanical shafts. The shaft's angular position is analogous to some aerodynamic quantity calculated in response to a student's movement of control members within the flight simulator as well as constant values designed into the computer system in accordance with the physical properties of the type of aircraft simulated. The flight computer may for example be of any type which solves the simultaneous equations of flight and uses the output to activate an electromechanical servo or integrator shaft upon which are mounted cams set to control switches whenever the shaft position is analogous to an unsafe flight condition. One example of such a computer for solving simultaneous equations is shown in U.S. Patent 2,742,227, issued April 17, 1956, to F. W. Bubb, entitled, "Electrical Computer for Solving Simultaneous Equations," the disclosure of which is incorporated herein by reference.

The basic quantities from which the crash indication is to be derived are flight values of pitch angle, roll angle, rate of climb, Mach number and gravitational force, as well as the position of the landing gear. An indication of the mass of the aircraft at all times is needed to provide accurate computation for force under the varying conditions of flight.

The quantities pitch angle, roll angle, landing gear not lowered and rate of climb, as far as constituting crash conditions are concerned, are all dependent upon the simulated aircraft being on the ground while crash conditions may occur during flight if Mach number, total force, or a given force for a given aircraft mass is in excess of safe values.

The end indication to the student pilot comprises a brilliant red flash of light, the ringing of a crash bell, the extinguishment of the daylight lights surrounding the cockpit, the inactivation of the flight computers and their indications, or other similar indicator.

Referring now to the drawing, a rate of climb computer designated $dh/dt$ 2 is connected by conductor 4 to one set of switch contacts 10 of relay 6. The arm connection of contacts 10 is connected by conductor 7 to one side of impedance 9, the other side of which is connected to summing point 15. A simulated flight computer 3 which computes the value of force in the vertical plane plus a quantity analogous to the force of gravity is connected by conductor 5 to switch contacts 20 of relay 6. The arm of switch contacts 20 is connected by conductor 8 to one side of impedance 11 the other side of which is connected to the summing point 15. A source of 60 cycle potential 12 is connected to one terminal of switch 13 which is operated by the reset switch. The arm of this switch arrangement is connected to input impedance 14 which is also connected to the tie or summing point 15.

Summing point 15 represents the input to the land-air selector 16 which under certain conditions mechanically activates the arm 17 to disconnect the circuit continuity between the altitude information conductor 21 and the land buss conductor 18. The land buss 18 interconnects the arms of switches 76, 22, 24, 26 and the relay coil 6. Switch 28 is activated in accordance with the simulated flight characteristic of velocity by a Mach number exceeded cam on the Mach number shaft and is connected to the 28 volt source 41 which is conducted through to contact 19 when the switch 23 is closed. Switch contacts 77, 23, 25, 19 and 27 become activated according to the operation of switches 76, 22, 24, 28 and 26 and are all tied to the buss 30 which is in turn connected to the coil of the crash conditions relay 29.

A potentiometer arrangement activated in response to the mass computer is shown as impedance 33 and potentiometer 32 having a movable arm to which a positive phase 50 volt supply 31 is connected. The junction 35 between impedance 33 and potentiometer 32 represents a potential point analogous to mass of the aircraft being simulated at any given instant. This value or voltage is connected to one side of impedance 34, the other side being connected to junction point 38. A computer 36 which determines the force on the simulated aircraft, in terms of gravitational force units, has an output which is fed to impedance 37 which is connected to junction 38. The potential appearing at junction 38 is connected to the input of the selector 39 whose output is tied to contact terminal 40 of switch 1. The 28 volts supply 41 is tied to the other contact terminal of switch 1. The arm contact 42 of the switch 1 is connected to the crash condition buss 30 and to the energizing coil of relay 29.

The activation of relay 29 closes switch 43 to make continuous a path for the 28 volt supply 41 through the switch 43 to terminal 44 of the crash buss 45. The crash buss 45 comprises leads which go to the trainer freeze circuit, to the instructor's crash light 72, to the delay relay unit 56, and to the crash relay 55 which has contacts 51, 52, 53 and 54 associated therewith. When the crash relay 55 is de-energized, 115 volt A.C. is connected between supply point 50 through relay contacts to terminal 51 and from there to conductor 48 which is tied to the instructor's daylight control 67. The control 67 is activated by mechanical shaft 69 from the instructor's day-night control knob 68. Operation of the knob 68 varies a rheostat within the daylight control 67 so as to vary the voltage appearing on conductor 70 which is tied to the daylight lights 71 which are in turn returned to ground terminals 66. The single light shown is representative of the plurality of lights used for the purpose of simulating daylight.

Contact 53 of crash relay 55 is connected by conductor 47 to reset switch 46 which controls the flow of current from the 28 volt supply 41. Contact 52 of crash relay 55 is connected to the crash buss 45. Terminal 54 of the crash relay 55 is connected by conductor 49 to the switch 58 which is activated by the crash effects relay 61. When the switch 58 is closed, contact is made between conductor 49 and conductor 63 which is connected to the red crash lights 65. The thermal delay relay or bulb 56 has contacts 59 and 60 which tie between the crash buss 45 and the crash effects relay 61. The delay relay has a heater 75 which is the activating element for the time delay relay 56. Also tied to the crash buss 45 is the switch 57 which operates in accordance with the crash effects relay 61 and upon closing, unites the crash buss 45 with the conductor 62 which is connected to the crash bell 64, the ground return being supplied through terminal 66. The instructor's crash light 72 is connected between ground 66 and the crash buss 45 to activate whenever the crash buss is activated.

*Operation of the condition indicator*

The condition indicator provides a circuit for use with any device requiring visual or aural indication of the presence of a condition. The indicator may be used in flying or grounded flight training devices. The condition indicator in its preferred embodiment relies upon cam operated switches which are driven by electromechanical shafts whose angular position is analogous to one or more aerodynamic or flight conditions. The invention pertains more specifically to the indications presented to students of a flight simulator training device to show that the simulated craft has exceeded the structural or placarded limits of the airplane and would therefore have crashed if it were a real craft. The conditions of crash may be met while the airplane is flying or at the instant of landing or touchdown. In the former case, the conditions might be such things as "Mach number exceeded" or "G's exceeded." Accessory items such as flaps, speed brakes, landing gear also often have limits placarded that may be included in these flight crash conditions.

At the instant of touchdown a crash is warranted if pitch or roll attitude exceed defined limits, if rate of descent is excessive, if gross weight has not been reduced to a safe limit, or if landing gear has not been lowered. Any one of these conditions may cause a crash indication. Referring to the drawing, two selectors and numerous relays are used in the simulation. One selector decides the "break ground" point and the "touchdown" point and keeps account of whether the airplane is in the air or on the ground. The other selector establishes the limiting force or G value at all times for the gross weight of the aircraft.

The drawing shows a typical crash indication simulation. A crash condition relay is energized whenever any one or more of the following flight conditions are met:

(1) If pitch angle theta is equal to or greater than K1 radians.
(2) If pitch angle theta is equal to or less than minus K2 radians.
(3) If rate of climb $dh/dt$ is equal to or greater than a safe rate.
(4) If roll angle phi is equal to or greater than K3 radians.
(5) If roll angle is equal to or less than minus K3 radians.
(6) If the landing gear has not been lowered.

These six conditions may cause a crash indication when the aircraft is on the land or in very close proximity to land.

(7) If Mach number is greater than K4.
(8) If G force is equal to or less than minus K5.
(9) If G force is equal to or greater than minus K5 and G for a given mass has been exceeded.

K1, K2, K3, K4 and K5 are constants determined by the aircraft configuration.

Conditions 1 through 6 are only met when the simulated aircraft is on the land. This condition is realized with a land-air selector 16 which acts as an enabling means for flight condition cam switches. It consists of a sensitive electronic selector which energizes a relay, of which switch 17 represents one set of contacts, whenever the input to the selector 16 is a positive phase. The relay being energized indicates the craft is airborne. When this relay is energized, the conductor 21 carrying a D.C. voltage from a cam on the altitude servo is broken by the contacts of said relay 17. As shown in the drawing, a rate of climb computer $dh/dt$ 2 feeds an A.C. voltage input to switch 10 which is controlled by land relay 6. If the relay 6 is not energized, the $dh/dt$ input is feed to the selector and if its phase is negative as compared to a reference phase, the selector relay will remain de-energized so that if altitude becomes less than ten feet, for example, a D.C. voltage is fed on conductor 21 from the ten foot cam on altitude shaft through switch 17 to the land buss 18. Activation of the land buss 18 energizes the land relay 6 and thereby disconnects the rate of climb computer from the land-air selector and connects a vertical force plus gravity computer output to the selector. Thus, when the simulated airplane is on the ground, the input to the selector becomes positive when the quantity −F+32.17 m. becomes positive. This can only occur when aerodynamic force F is negative and is greater than the gravitational force 32.17 m. F which is defined as aerodynamic force along the vertical wind axis, is defined as positive downward. It therefore becomes apparent that when the vertical component of lift force −F becomes greater than the weight of the airplane +32.17 m. a positive voltage is applied to the input of the selector 16 and the selector relay energizes opening the current path 17 to the land buss 18. This land buss 18 cannot be energized unless rate of climb dh/dt becomes negative and altitude is less than ten feet. At that time, the selector delay is de-energized and the voltage from the altitude cam is supplied to the land buss. Activation, by the instructor, of the reset control closes switch 13 to apply a negative phase A.C. potential through impedance 14 to the selector so as to override any other selector input, thereby resetting the selector.

Conditions 1 through 6 are also dependent upon the flight conditions pitch angle θ, roll angle φ, rate of climb dh/dt, and landing gear position. In the case of θ and φ, the voltage from the land buss is put through the contacts 22—23 and 26—27 only when θ or φ is greater or less than the angle prescribed by the configuration of the aircraft being simulated as sufficient to cause a crash. The switches are controlled by cam switches on their respective electromechanical shafts. In the case of rate of climb dh/dt, a cam on rate of climb shaft directly switches the land voltage through arm 24 and contact 25 to crash conditions buss 30. In the case of switch 76, if the landing gear is not down, the switch is closed on contact 77 thereby connecting the buss 18 with the buss 30.

Thus it is seen that the switching means associated with excessive rate of climb, landing gear not lowered, roll angle and pitch angle is connected in series between the land-air selector and the indicator means so as to activate the indicator means when the land-air selector indicates the simulated craft is on the ground and an excessive or unsafe flight condition of no gear, rate of climb, pitch angle or roll angle exists.

Some unsafe flight conditions exist independent of land-air determination and therefore switches activated by such flight conditions are connected directly to the indicating means. Flight condition 7 above, which can occur only during airborne operation, is simulated by a cam switch 28 mounted directly on the Mach shaft. Flight conditions 8 and 9 are determined by an electronic selector 39 and a cam switch 1 on the G or acceleration shaft. When G is less, in absolute terms, than some negative value like minus K5, which could be minus 1G, the cam on the G shaft provides 28 volts D.C. directly to the crash condition relay 29. If G is greater, in absolute terms, than minus K5, the decision for crash comes from the selector 39. At its input 38, a G force analog voltage from computer 36 and the mass analog voltage from junction 35 are compared so the selector effectively sees 1/m.−G. When this sum is negative, the selector puts out a D.C. voltage to cause a crash condition. It can be readily seen, that at a larger mass, less G's are required to cause a crash.

When the crash conditions relay 29 is energized for any one of the above reasons, a voltage is applied through switch 43 and contact 44 to crash buss 45 to crash relay 55 which is energized and is self-held closed until the computer is reset. This self-holding is accomplished by conducting voltage from the 28 volt D.C. supply 41 through switch 46 of the reset relay to conductor 47 which is tied to terminal 53 so that when the crash relay 55 is energized, the potential arm contact 53 is connected to terminal 52 which holds in the crash relay 55 by means of the crash buss 45. This self-holding voltage is also conducted to the trainer freeze circuits to disable the flight computers in the simulator, and also to illuminate the instructor's crash light 72. It also energizes a crash effects relay through the normally closed contacts 59 and 60 of the five second time delay relay 56. Activation of the crash relay 55 disconnects or breaks continuity between the 115 volts supply 50 to terminal 51 of the relay thereby extinguishing the daylight cockpit window lighting 71. In doing so, the 115 volts supply is connected to terminal 54 of relay 55 and is thereby conducted to switch 58 through the energized crash effects relay to illuminate the red crash lighting 65. Energizing the crash effects relay 61 also activates the crash bell 64 by means of the switch 57 contacts. It is seen that as soon as the crash buss 45 become energized a potential appears across the heater 75 of the five second delay bulb delay relay 56. At the end of five seconds, for example, the time relay contacts 59 and 60 open up to turn off the crash bell and the brilliant red lights by de-energizing the crash effects relay 61. However, the trainer remains in freeze, the instructor's crash light remains illuminated and the cockpit window lighting remains off until the instructor resets the problem. Resetting the problem, by activating the reset switch, breaks the holding circuit to the crash buss thereby restoring the crash condition indicator to its normal condition.

It is thus seen that the invention provides a visual indication of an instructor's crash light, a red crash light for the student, and the elimination of the daylight lights upon the indication of a crash as well as the aural signal from the crash bell when a crash indication is warranted.

It should also be noted that the crash bell and red light indications are removed approximately five seconds after the initial crash condition while the other indications such as instructor's crash light, student's daylight light and trainer freeze are maintained until the trainer is reset or reactivated by the instructor. The five second period is arbitrary in length, but some shut off time should be provided.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In an aircraft flight simulator, a computer system productive of mechanical movements continuously representative of each of several flight conditions, a first set of electrical switches each actuated by one of said mechanical movements in response to representation of a condition which would cause a crash during landing, including at least one of the following conditions: excessive pitch angle, excessive roll angle, excessive rate of descent and failure to lower landing gear, a second set of electrical switches each actuated by one of said mechanical movements in response to representation of a condition which would cause a crash either in flight or while landing, including at least one of the following conditions: excessive Mach number, excessive G force, a connector common to one side of said first as well as said second set of electrical switches, crash indicating means connected to said common connector, a source of electrical power to operate said crash indicating means connected to the other side of said second set of electrical switches, a rate of climb computer for generating a potential analogous to rate of climb, an altitude potential representative of altitude less than a designated quantity, land-air switching means operative in response to the altitude quantity and the said rate of climb potential for connecting the said altitude potential to the other side of said first set of electrical switches whereby the said crash indicating means will become energized upon the concurrent existence of any of the flight conditions represented by the said first set of electrical switches and proximity to the ground.

2. Apparatus as in claim 1 providing in addition a source of electrical power operative of said crash indicator if the combination of aircraft mass and G force exceeds an unsafe value.

3. Apparatus as in claim 1 in which said indicating means includes an audible signal, a visible signal, extinguishment of daylight simulating illumination, and an instructor's visual signal.

4. Apparatus as in claim 3 including time delay means postponing for a preset interval actuation of said audible and visible alarm signals after crash conditions are obtained.

5. Apparatus as in claim 1 in which switch actuation for excessive vertical acceleration is provided with means to modify the value of excessive G value condition to allow for the variation in gross weight of the aircraft so that decreasing negative deceleration effects correspond to a crash condition with increasing aircraft gross weight.

References Cited in the file of this patent

UNITED STATES PATENTS

| | | |
|---|---|---|
| 2,506,949 | Burelbach et al. | May 9, 1950 |
| 2,510,500 | Hayes et al. | June 6, 1950 |
| 2,554,155 | Rippere | May 22, 1951 |
| 2,584,261 | Davis et al. | Feb. 5, 1952 |
| 2,731,737 | Stern | Jan. 24, 1956 |